United States Patent [19]

Giardini

[11] 4,203,393
[45] May 20, 1980

[54] PLASMA JET IGNITION ENGINE AND METHOD

[75] Inventor: Dante S. Giardini, Dearborn Hts., Mich.

[73] Assignee: Ford Motor Company, Dearborn, Mich.

[21] Appl. No.: 957

[22] Filed: Jan. 4, 1979

[51] Int. Cl.² .................... F02B 17/00; F02B 19/08
[52] U.S. Cl. ................... 123/30 D; 123/32 B; 123/32 SP; 123/143 B; 123/191 S
[58] Field of Search .................. 123/30 C, 30 D, 32 B, 123/32 SP, 32 C, 32 ST, 143 B, 191 S, 191 SP

[56] References Cited

U.S. PATENT DOCUMENTS

| | | | |
|---|---|---|---|
| 3,195,519 | 7/1965 | Bishop et al. | 123/32 ST |
| 3,270,721 | 9/1966 | Hideg et al. | 123/32 ST |
| 3,315,650 | 4/1967 | Bishop et al. | 123/30 D |
| 3,439,656 | 4/1969 | Hideg | 123/119 R X |
| 3,696,798 | 10/1972 | Bishop et al. | 123/32 R X |
| 3,921,605 | 11/1975 | Wyczalek | 123/143 B |
| 4,029,072 | 6/1977 | Goto et al. | 123/143 B X |

FOREIGN PATENT DOCUMENTS 500123  6/1930  Fed. Rep. of Germany ......... 123/32 B

OTHER PUBLICATIONS

SAE Paper No. 770355, "Design of a Plasma Jet Ignition System for Automotive Application", by Asik, Piatkowski, Foucher, and Rado, Feb.–Mar., 1977.

Primary Examiner—Tony M. Argenbright
Attorney, Agent, or Firm—Joseph W. Malleck; Keith L. Zerschling

[57] ABSTRACT

A method and apparatus for carrying out combustion in an internal combustion engine of the stratified charge type is disclosed. The piston and cylinder are shaped in a manner to define a variable volume space and a main combustion chamber residing as a cavity in the top face of the piston, the cavity being in communication with the variable volume space. The cylinder has an intake port oriented to induce a swirl motion to air inducted into the variable volume space.

A shock wave chamber is defined with walls projecting from the cylinder head into the main combustion chamber when the piston in its top dead center position. The shock wave chamber (or intermediate chamber) has openings to permit circulatory transfer motion of the air to enter and exit from the central bottom thereof. The intermediate chamber is adapted to receive a plasma sonic jet directed axially downwardly therethrough to penetrate the exit opening of said intermediate chamber. Fuel injection is timed to introduce a spray of fuel to said intermediate chamber to be ignited by said plasma sonic torch passing therethrough to promote a flaming jet which extends into said main combustion chamber for completion of combustion.

14 Claims, 2 Drawing Figures

PLASMA JET IGNITION ENGINE AND METHOD

BACKGROUND OF THE INVENTION

This invention is concerned with stratified charge internal combustion engines, wherein the charge mixture or elements are subjected to a high transfer motion, during the compression cycle, consisting essentially of induction swirl and squish action. This type of invention is commonly referred to in the art as a programmed combustion engine (PROCO) which has been developed by the assignee hereof, and is particularly depicted in U.S. Pat. Nos. 3,315,650; 3,439,656; and 3,696,798.

This type of stratified charge combustion process employs an essentially unthrottled charge of air which is taken into the engine at all times; fuel is injected directly into a localized portion of this charge of air in a main combustion chamber defined by the piston and cylinder, the fuel being varied with load and operating requirements of the engine. The pressure and fuel controls being such as to cause a slow dispersing of the fuel particles into the air in a manner permitting the control of the air-fuel ratio change so that the local mixture can be ignited at the proper time to assure more complete combustion within a predetermined crankshaft rotation and before the overall air-fuel ratio becomes too lean.

Post-ignition turbulence of the charge is assured by the combination of the induction swirl and squish action. Induction swirl is promoted principally by locating the induction port and valve offcenter and nonradial with respect to the axis of the cylinder, whereby a swirl motion is imparted to the air as it is sucked into the main cylinder. The swirl rate is proportional to the crankshaft speed and the only requirement is that it be repeatable from cycle to cycle and cylinder to cylinder.

Squish action is promoted by locating the main combustion chamber (as a cup) in the piston so that the uninterrupted top surface of the piston may be moved to critically close spacing (squish zone) with the head of the cylinder at top dead center, the space being limited to a dimension of 0.06–0.10 inches. The air or charge elements residing in this progressively decreasing squish zone, between the uninterrupted top surface of the piston and the cylinder head, are forced to move radially inwardly. The mass of air, converging towards the center of the upper most region of the cylinder, is forced to turn downward as it reaches the central region forming an air column which moves downwardly meeting the bottom of the cavity within the piston and spreading radially outwardly therefrom.

In the conventional PROCO combustion system two problems are of great concern: (a) the high transfer motion tends to extinguish the starting flame, and (b) even if the flame is not extinguished, there is an entrapment of unburned charge elements in the squish zone. With respect to the first problem, it must be emphasized that the use of the cavity or cup within the top of the piston is essential to better engine efficiency, because at low loads, fuel can be injected principally into the cup close to top dead center and combustion can be confined principally to the cup itself. At high loads, fuel can be injected earlier into the cylinder which would include the squish zone in addition to the cup or cavity thereby giving considerably increased power. Accordingly, it is important that the concept of high charge transfer motion be retained to maintain the benefits of programmed combustion, but without the extinguishment of the combustion flame.

Turning to the second problem; typically, a PROCO combustion system is ignited by the use of a single spark plug. The initiation of combustion is timed such that fuel injection is introduced considerably early but the flame does not reach the squish zone until top dead center is substantially achieved, thereby resulting in high hydrocarbons. Even when two spark plugs are used, arranged symmetrically on either side of a centrally located fuel injector, the problem of uncombusted hydrocarbons remains. With two spark plugs, more exhaust gas recirculation may be incorporated permitting somewhat later injection of the fuel, but initiation of the combustion must still be maintained at a moment close to top dead center which results in the trapping of hydrocarbons in the squish zone. What is needed is a system whereby fuel injected into the squish zone, as well as the cup or cavity, can be continuously moved by charge transfer motion into the cup where the initiation of combustion can take place prior to the attainment of top dead center and the combusted gases resulting from combustion in the cup can be moved to displace the unburned hydrocarbons in the squish zone.

SUMMARY OF THE INVENTION

A primary object of this invention is to provide an improved method for carrying out combustion in a stratified charge engine of the type employing high transfer motion of the charge elements.

Another object of this invention is to provide an improved combustion system for a stratified charge engine wherein a body of fully burned gases displaces the unburned charge gases in the squish zone during the expansion cycle.

It is an additional object to provide a combustion system which overcomes the undesirable aspect of swirl motion which tends to inertially encourage separation of much of the fuel charge to the combustion chamber side walls, which still retaining the beneficial aspect of swirl motion which provides better turbulent mixing of burned and unburned elements within the combustion chamber.

Another object of this invention is to provide an engine apparatus having an intermediate chamber into which a plasma torch is injected along with the introduction of fuel, said intermediate chamber having walls which retain the residual heat of previous cycles thereby improving vaporization of fuel injected thereinto. It is also an object to provide an improved apparatus for carrying out combustion in a stratified charge internal combustion engine, said apparatus employing a foraminous wall chamber between a prechamber for generating torch gases and the main combustion chamber, the walls of said foraminous chamber serving to retain residual heat of previous combustion cycles thereby improving vaporization of fuel injected thereinto.

Yet still another object of this invention is to provide an apparatus for a stratified charge engine which is effective to transfer the full energy of spark ignition to an instantaneous flow of charge gases.

Features pursuant to the above objects comprise: (a) the use of a spark plug effective to induce a sonic plasma gas jet into a fuel-air mixture for igniting the latter, (b) the use of an intermediate chamber defined by a foraminous thin wall structure, into which the plasma jet is directed and into which fuel is injected, said intermediate chamber serving to receive and employ the sonic shock wave resulting from the initiation of said plasma jet and to induce circulatory flow therethrough in a direction complimentary to the transfer motion of the gases in the main combustion chamber during the latest states of compression, the sonic shock wave exiting from the intermediate chamber to be reflected by a splitter member stationed on the bottom of the combustion chamber, (c) arranging the intermediate chamber so that openings therein provide for self-purging of combusted gases, (d) the use of an intermediate cavity design that permits the shock wave energy to be deployed for inducing the proper flow therethrough and spark heat energy is deployed to generate a sustained body of high energy burned gases which provide proper ignition.

DETAILED DESCRIPTION

In spark ignition engines, poor ignition and misfire often occurs when using a lean fuel/air mixture. In order to obtain reliable ignition of such lean fuel mixture, diverse investigations have been carried out, such as increasing the spark discharge energy. However, this has not proven entirely satisfactory because it heats only a local spot.

Another problem has arisen to compound the poor ignition of lean mixtures. In order to reduce emissions and at the same time provide for increased power over a variety of engine loading conditions, programmed combustion of a stratified charge has been employed by the prior art. This system teaches that fuel, at low pressures, should be injected through wide conical angles into an essentially unthrottled charge of air in the combustion chamber of an engine; the main combustion chamber is recessed within the top of the piston and the induction port is offset eccentrically with respect to the main cylinders so that a composite charge transfer motion is imparted to gases therein during compression. In this manner the fuel particles, injected thereinto, are slowly dispersed into the air in a manner permitting the control of the air/fuel ratio charge so that the locally rich mixture can be ignited at the proper time to assure more complete combustion with a predetermined degree of crankshaft rotation and before the overall air-fuel ratio becomes too lean. Unfortunately, the strong transfer motion of the charge, so necessary to improve post-combustion mixing, frequently extinguishes the combustion flame.

Thus, increasing the spark discharge energy does not satisfactorily achieve consistent ignition in a high transfer motion stratified charge engine. This is in part explainable by considering that the fuel air mixture is directly heated by the energy release from the spark. It is known that increasing the spark energy over a specified value (the general specified value is typically 30 millijoules), without more, does not increase ignitability over an extended period; the spark energy is not effectively transmitted to the entire circumferential mixture. That is to say, as only a limited partial mixture around the sparking gap is heated up to an ignitable temperature by the spark energy, a small spot-like flame, at best, is initially generated by ignition of the mixture. The small spot-like flame is immediately cooled down so as to be extinguished by the circumferential unburned mixture undergoing transfer motion. Thus, flame propagation is not obtained and misfire occurs in the engine.

Figure 1:
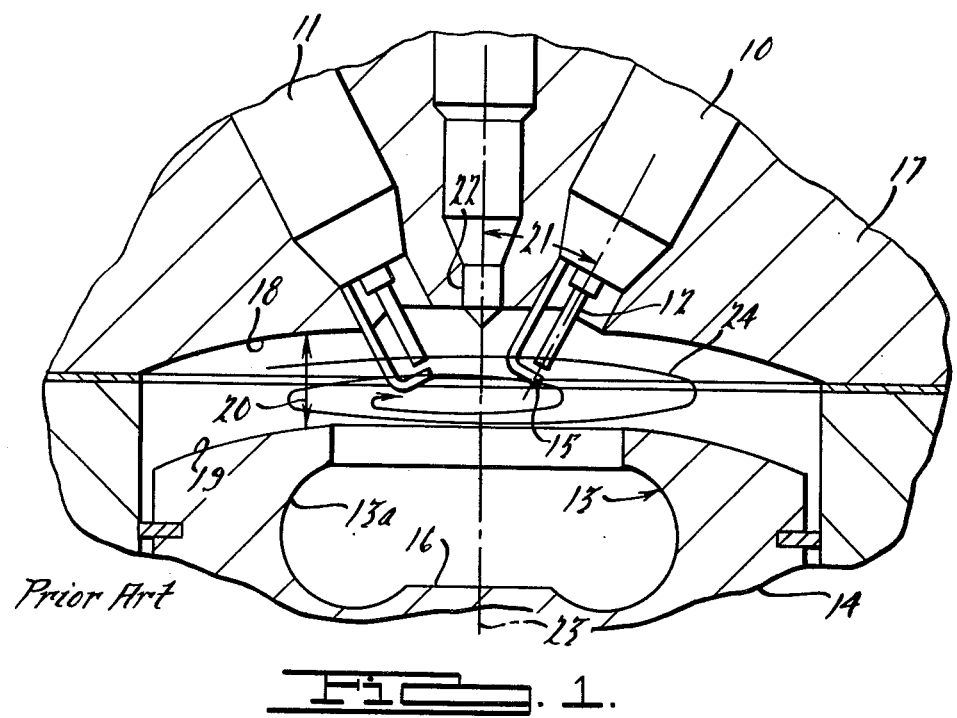
FIG. 1 is a fragmentary sectional view of a portion of an internal combustion engine, characteristic of the prior art, and capable of carrying out programmed combustion of a stratified charge; the charge undergoes considerable transfer motion during the last stages of compression.

As shown in FIG. 1, one attempt by the prior art has been to employ dual spark plugs 10 and 11 having extended electrodes 12 and 15 which penetrate to the upper region of cavity 13 in the piston 14. In the embodiment of FIG. 1, the piston has defined in its upper central region the cavity 13 which constitutes principally the entire main combustion chamber when the piston is at top dead center. This cavity 13 has an undercut sidewall 13a with a raised portion 16 on the bottom acting as a splitter for air motion directed thereinto. The cylinder head 17 has an interior surface 18 shaped complimentary with the uninterrupted top surface 19 of the piston so that, at or near top dead center, the surfaces 18 and 19 will be closely and uniformly spaced apart a distance 20 of 0.06–0.10 inches. The dual spark plugs project inwardly at angles 21 of about 30° (made with a central axis of said cylinder); a fuel injection nozzle 22 is employed to spray a conical configuration of fuel directly into and along the axis 23 of said cylinder.

There are two vector forces acting upon the gases within the main cylinder during compression, the first of which is a circular motion 24 imparted to the air therein as a result of locating the induction port (not shown) eccentric or off center with respect to the axis 23 of the cylinder, thereby providing for a general swirling motion which permits the gases to move circularly about the cylinder space prior to compression (see FIG. 1). As the compression stage progresses, gases between the piston top surface and cylinder head are urged to move radially inwardly, as at 25 and since the mass of such gases cannot all move into the central region of a given torus, the gases must gradually turn and move downward through a central air column 27; as the air column reaches the bottom of the cavity, it is turned outwardly by splitter 28 to move radially in all directions against the outer walls 13a of the piston cavity (see FIG. 2). This completes a circulatory squish motion. The combination of the slow swirling action and the radially inward squish action imparts a toroidal vector to such gases as they enter and move about the piston cavity. During the latest stages of compression, this transfer motion is extremely high.

It has even been proposed that one of the dual spark plugs of FIG. 1 be ignited at a later time sequence, possibly after top dead center, so that a more complete burning of the mixture may take place to lower emissions. This has proven inadequate because the flame front from the first single spark continues to be insufficient to carry out proper combustion in the early stages with such high transfer charge motion.

Figure 2:
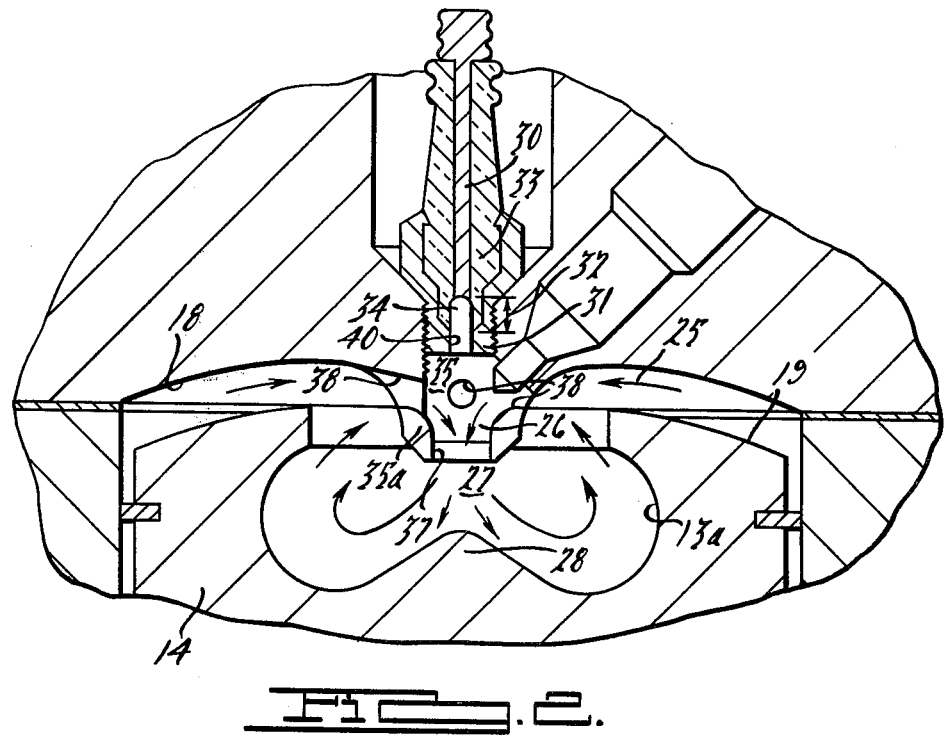
FIG. 2 is a view similar to that of FIG. 1, but embodying the principles of this invention.

This invention proposes in FIG. 2 that the conventional spark plug be replaced by a sonic plasma type plug. Plasma plugs are described in U.S. Pat. Nos. 3,842,818 and 3,842,819 or 3,911,307. A central positive electrode 30 and an outer negative electrode 31, facing the positive electrode across a sparking gap 32. The plug further comprises an electric insulative member 33 for enclosing the sparking gap so that a discharge chamber 34 is defined by the insulative member. The positive electrode 30 and the negative electrode 31 and the discharge chamber 34 being operable to produce a plasma-like gas which is heated so instantaneously that a shock wave is created. A nozzle is provided from said discharge chamber enabling the plasma-like gas to jet into an intermediate chamber 35 having walls 35a constructed as an appendage on the head 17 of the cylinder and depending downwardly therefrom. The piston 14 has a cavity 13 similar to that in FIG. 1; the walls 35a defining said intermediate chamber are located so that they extend into such cavity at the top dead center position of the piston. The intermediate chamber has a bottom opening 37 serving as a jet orifice and a plurality of circular side openings 38 located in line with the squish action which proceeds radially inwardly from the body, there adjacent the roof of the cylinder.

The fuel injector may be of the type described in U.S. Pat. No. 3,315,650, particularly column 17, lines 9 through 58. The fuel injector is oriented to spray a conical pattern of fuel particles into the shock wave intermediate cavity. Since the fuel is segregated locally, the longer the higher voltage ignition source (plasma jet) will see a richer mixture and the right air-fuel ratio for a greater period of the expansion cycle than heretofore made possible by prior art constructions. For example, the plasma jet is sustained for a crank angle of about 16° BTDC to 10° ATDC (for spark advance) and 5° ATDC to 10° ATDC for spark retard), and the duration during which fuel is injected is for a period of 40° BTCD to about 20° ATDC (a 60° crank angle). The initiation of fuel injection precedes the entrance of the plasma jet into the intermediate cavity. Due to the retention of heat by the walls of the intermediate chamber, from previous combustion cycling, the sprayed fuel particles are vaporized more readily upon contact with such walls facilitating more rapid mixing of the particles as a gaseous fuel mixture.

The plasma plug or plasma jet ignition system can be considered a form of electrical torch ignition, since the ignition source is a hot jet of plasma which projects well away from the spark plug. The plasma jet ignition source is turbulent, a desirable feature for igniting lean mixtures. The ignition design energy ranges from about 200 to 1000 millijoules, a very high energy ignition source when compared to the energy level of 0.03 joules for a conventional spark plug. This level of electrical energy (about 1 joule) is delivered to the plasma cavity in a short period of time. The over pressure of the ionized gases within the spark plug cavity is used to eject the plasma jet. This plasma consists of free electrons and ions that are at a high temperature (10,000–30,000° K.) and are highly energetic and chemically active. The plasma is produced by the shock heating of the gas confined in the plasma cavity by the electrical energy. This raises the temperature of the confined gas and produced partial ionization; the sudden increase in temperature also raises the instantaneous pressure of the partially confined plasma, causing a substantial portion of it to be ejected out of the orifice 40 at the bottom end of the plasma cavity preceded by a sonic shock wave.

There are several design parameters for the generation of the sonic plasma jet, the most primary being the plasma cavity dimensions. It has been found that there must be a minimum diameter of about 0.052 inches. If the cavity diameter is smaller than this value, the energy is not properly discharged. On the other hand, if the cavity diameter became 0.110 inches or larger, jet action becomes very weak.

The applied energy should be about 3000 volts or greater with a stored energy of 1,125 joules. The cavity orifice size should be generally equal to the cross section of the plasma cavity itself. The critical minimum diameter is believed to be related to the suppression of the glow to arc transition in narrow capillaries. The existence of the maximum diameter may be caused by a lack of sufficient input electrical energy to heat and ionize a larger volume of gases associated with the larger diameter.

In operation, the combustion system of this invention first inducts air into the cylindrical chamber when the piston is at a position of about 225° BTDC. This air induction continues for a duration of about 50° of crank angle, until the piston is at a position slightly after bottom center. During this induction, a gradual swirl is imparted to the air by location of the intake port and valve offcenter and non-radial with respect to the cylindrical chamber axis. Such air swirl progressively becomes toroidal moving into the piston cavity 13 as the piston approaches top dead center position. Such approach also causes a gradual and increasing movement of the mass of air radially inward, towards the center of the cylinder, where it is forced to progressively turn downward and form the air column 27 through the central axis of the cavity. The air mass, upon meeting the bottom splitter 28 portion is directed radially outwardly along the bottom of the cavity to then rise again along the undercut walls 13a of the cavity. When the spacing between the top surface 19 of the piston and the cylinder head surface 18 is in the range of 0.5–0.1 inches, this motion becomes a vector combination of swirl and squish action, and aligns with the openings 38 of the intermediate chamber. The inward squish action enters openings 38 and exits from such chamber through the opening 37 at the bottom thereof. With such combined transfer motions now permeating the intermediate chamber a plasma, sonic torch is generated to extend axially downwardly through said intermediate chamber, such torch is generated by high energy spark ignition within the primary prechamber 34 of the plasma plug. With the plasma sonic torch extending through said intermediate cavity, fuel injection is then initiated in a manner to control the timing of the combustion. The turbulently mixed gaseous mixture, within the intermediate chamber, is thus ignited and oriented to move progressively through the circulatory pattern as indicated in FIG. 2.

As a result of such combustion sequence, several advantages accrue: (a) the locally rich mixture that is seen by the igniting plasma torch is consistently the right air-fuel ratio as predetermined by design; (b) vaporization of the fuel particles is promoted by the hot walls of the intermediate chamber; (c) the flame front ignited by said plasma torch will not be extinguished by high squish and swirl motions, the latter being needed to provide increased power and better combustion mixing; and (d) both the intermediate chamber and the squish zone is inherently purged of unburned hydrocarbons prior to the completion of the combustion cycle, resulting in lower emissions.

The cavity dimension used for the experiments confirming this invention had a cavity depth of 0.1 inch and a diameter of 0.1 inch resulting in a volume of $0.75 \times 10^{-3}$ (or $1.2 \times 10^{-2}$ cm$^3$). The quantity of fuel present in the plasma cavity provided an air-fuel ratio of between 18–26. With such parameters, the length and diameter of the luminous plume of the plasma jet was respectively about 1.0 inches, and about 0.31 inches. The bottom opening of the intermediate chamber was sized to be larger than the diameter of such luminous plume, and the side wall openings of the chamber had a diameter of about 0.18 inches. Results of such tests showed that combustion moved through the combustion chamber with great stability and quickness, involving almost total combustion of all charge elements. This results in part by proper deployment of the shock wave. The prior art has used plasma plugs but failed to direct the shock wave energy (pressure) so that it would move through the combustion chamber in a path complimentary to the gaseous transfer motion; this permitted mid-layer extinguishment of the combustion flame. This lack of shock wave energy direction was lost by absorption in the relative flat cylinder and piston wall surfaces usually without reflectance. In this invention the shock wave is reflected and focused by the walls of the intermediate chamber 35. The shock wave is directed out of the chamber 35 in a direction to generally follow the air column 27. Splitter 28 insures that almost all of the shock wave will be turned along the circulatory path of the gases and be reflected back towards the side walls and then back up. The advancing shock wave permits the flame front to move through the combustion chamber with authority and without extinguishment.

I claim:

1. An apparatus for carrying out combustion in an internal combustion engine, said engine having a piston and cylinder effective to define a variable volume space and a main combustion chamber residing as a cavity in the top of the piston and communicating with the variable volume space, said cylinder having an intake port oriented to induce a swirl motion to air inducted into said variable volume space, and said space being varied in volume by said piston during compression to induce a high radially inwardly squish motion to said air to form a circulatory path having an air column entering and extending into the central region of said main combustion chamber and exiting therefrom along the sides, said swirl motion and squish motion cooperating to impart a circulatory transfer motion to charge elements in said main chamber, the improvement comprising:
   (a) means defining a shock wave chamber integral with said cylinder and having walls extending into said piston cavity when said piston is in a substantially top dead center condition, said shock wave chamber having an exit and an entrance respectively aligned with the path of the circulatory transfer motion of said charge elements,
   (b) means defining a plasma cavity in communication with said shock wave chamber, said plasma cavity having an orifice communicating with said shock wave chamber at a side opposite from said exit, said orifice being aligned with the exit of said shock wave chamber,
   (c) means for injecting fuel into said shock wave chamber during compression so that the charge elements are forced to enter said plasma cavity momentarily prior to ignition,
   (d) means for applying a high energy discharge about 200 millijoules, through said plasma cavity causing the charge elements forced thereinto to be shock heated to an ionized condition and increased in pressure so that the ionized gas is ejected as a directed body of combusted ionized gases through said orifice, said ionized plasma jet igniting the mixture within said shock wave chamber and extending outwardly from the exit thereof preceded by said shock wave to additionally ignite the gaseous mixture in the main combustion chamber, said plasma jet extending through said shock wave cavity into the air column extending through said main combustion chamber.

2. The apparatus as in claim 1, in which the entrance to said shock wave chamber is comprised of a plurality of openings in the side walls of said chamber and arranged to be aligned with the squish motion of said air during the latest stages of compression.

3. The apparatus as in claim 1, in which the orifice of said plasma cavity is in the dimensional range of 0.052–0.11 inches.

4. The apparatus as in claim 1, in which said plasma cavity has a volume limited to about $0.75 \times 10^{-3}$ in$^3$.

5. The apparatus as in claim 1, in which the exit from said shock wave cavity is comprised of a circular opening having a diameter slightly in excess of the diameter of the ionized plasma jet plume.

6. The apparatus as in claim 1, in which the air-fuel ratio in said shock wave chamber during combustion is in the range of 18–26.

7. The apparatus as in claim 1, in which said means for supplying an energy discharge is effective to carry out said discharge for a period of 5–26° crank rotation, and in which said means for supplying fuel injection is effective to carry out said injection for a period of 60° of crank rotation.

8. The apparatus as in claim 1, in which said main combustion chamber has means to prevent absorption and promote reflectance of said shock wave in a direction complimentary to said circulatory transfer motion of said charge elements.

9. A method of carrying out combustion in an internal combustion engine, said engine having a piston and cylinder effective to define a variable volume space and a main combustion chamber residing as a cavity in the top face of the piston in communication with the variable volume space, the steps comrising:
   (a) interposing walls to define an intermediate chamber and to segregate a portion of the variable volume space, said chamber projecting into said main combustion chamber when the piston is substantially at top dead center, said intermediate chamber having an entrance and an exit aligned with the predetermined circulatory path of gases in said space,
   (b) inducting air into said variable volume space with a swirling motion about the axis of said cylinder,
   (c) compressing the air within said variable volume space and imparting a high radially inwardly squish motion to the air therein as said piston progressively approaches top dead center, said swirling motion and squish motion combining to define a circulatory path having a transfer motion from said variable volume space into said main combustion chamber defining a central air column which exits from said main combustion chamber along the sides thereof,
   (d) generating a sonic plasma jet having an energy level of at least 200 millijoules, and directing said jet through said intermediate chamber so as to penetrate the exit thereof and extend into said main combustion chamber, said plasma jet having a turbulating action and igniting action to promote combustion throughout said intermediate chamber and main combustion chamber, said jet also serving to aspirate air from said variable volume space through said entrance openings into said intermediate chamber and outwardly through said exit opening along with said jet, and (e) introducing a spray of fuel into said intermediate chamber in a predetermined time duration relative to the entrance of said plasma jet thereinto.

10. The method as in claim 9, in which the walls of said intermediate chamber are sized so as to retain residual heat from previous combustion cycles for promoting quicker vaporization of fuel introduced thereinto during step (e).

11. The method as in claim 9, in which the entrance area of each said intermediate chamber openings is less than the area of the exit opening.

12. The method as in claim 9, in which the main combustion chamber is provided with a centrally located splitter projection at the base thereof, effective to promote the spreading of the air column as it proceeds downwardly through said main combustion chamber and to reflect the shock wave to the side walls of the combustion chamber, and said main combustion chamber having undercut walls effective to promote the recircultion of air and re-reflectance of said shock wave in said main combustion chamber.

13. The method as in claim 9, in which fuel is injected into said intermediate chamber to provide a localized air-fuel ratio therein of 18–26.

14. The method as in claim 8, in which ignition is initiated at about 16° before top dead center.

* * * * *